United States Patent

Bala et al.

[11] Patent Number: 5,937,354
[45] Date of Patent: Aug. 10, 1999

[54] IN-BUILDING AND OUT-OF-BUILDING PERSONAL REACH COMMUNICATIONS SYSTEM

[75] Inventors: Srinivas Bala, Edison; Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corp, Middletown, N.J.

[21] Appl. No.: 08/668,661

[22] Filed: Jun. 25, 1996

[51] Int. Cl.⁶ .................................................. H04Q 7/00
[52] U.S. Cl. ............................................ 455/459; 455/456
[58] Field of Search ................................. 379/88, 89, 56, 379/217, 201, 211; 455/461, 31.2, 456, 459, 414, 432; 375/202

[56] References Cited

U.S. PATENT DOCUMENTS

| | | | |
|---|---|---|---|
| 4,107,473 | 8/1978 | Pierce | 379/217 |
| 4,748,655 | 5/1988 | Thrower et al. | 455/461 |
| 5,090,051 | 2/1992 | Muppidi et al. | 455/460 |
| 5,140,626 | 8/1992 | Ory et al. | 379/88.15 |
| 5,166,973 | 11/1992 | Hoff | 455/31.2 |
| 5,353,331 | 10/1994 | Emery et al. | 455/414 |
| 5,369,681 | 11/1994 | Boudreau et al. | 455/456 |
| 5,375,161 | 12/1994 | Fuller et al. | 455/459 |
| 5,375,162 | 12/1994 | Kim et al. | 455/459 |
| 5,432,845 | 7/1995 | Burd et al. | 379/210 |
| 5,519,718 | 5/1996 | Yokev et al. | 375/202 |
| 5,546,442 | 8/1996 | Foladare et al. | 455/417 |
| 5,598,457 | 1/1997 | Foladare et al. | 455/459 |
| 5,608,782 | 3/1997 | Carlsen et al. | 379/88 |
| 5,644,626 | 7/1997 | Carlsen et al. | 455/459 |
| 5,649,003 | 7/1997 | Kapsales et al. | 379/201 |
| 5,664,003 | 9/1997 | Foladare et al. | 455/459 |
| 5,706,329 | 1/1998 | Foladare et al. | 455/459 |
| 5,742,906 | 4/1998 | Foladare et al. | 455/461 |
| 5,761,277 | 6/1998 | Foladare et al. | 379/211 |
| 5,805,991 | 9/1998 | Foladare et al. | 455/459 |
| 5,884,167 | 3/1999 | Carlsen et al. | 455/432 |

FOREIGN PATENT DOCUMENTS 503813 9/1992 European Pat. Off. ................ 379/56

*Primary Examiner*—Salvatore Cangialosi

[57] ABSTRACT

In a personal reach telephone service in which a calling party's telephone call to a personal reach telephone number of a called party/subscriber is bridged to a return call placed by the called party/subscriber in response to a page which indicates to the called party/subscriber the presence of a waiting call, a connection is established between a bridging and signaling unit associated with the interexchange network to which the calling party is directed, and the home PBX associated with the called party/subscriber. After establishing the connection between the bridging and signaling unit and the home PBX, a determination is made, using two-way paging technology, whether the pager associated with the called party/subscriber is registered within the local area covered by the home PBX. If the pager is registered in the local area, then the calling party's call is connected directly to the PBX and a local page is broadcast to the called party/subscriber. If the called party/subscriber responds to the local page by means of a return telephone call to the PBX, then the calling party's call and the called party/subscriber's return call are bridged together by the local PBX and the bridging and signaling equipment associated with the interexchange network is disconnected. If the pager associated with the called party/subscriber is not registered in the local area, then a nationwide page is broadcast and a return call to the bridging and signaling equipment associated with the network is bridged to the calling party's call.

13 Claims, 3 Drawing Sheets

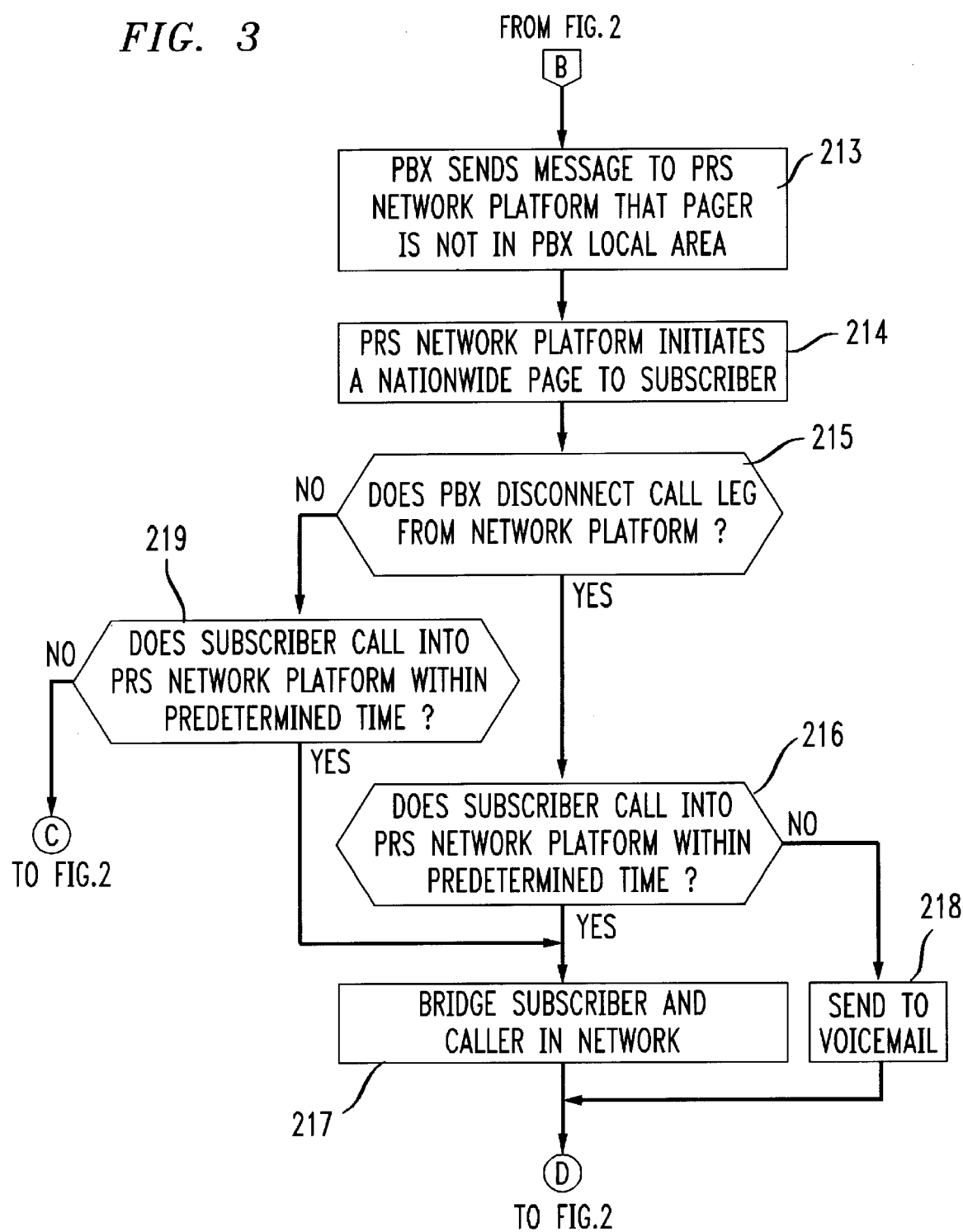

IN-BUILDING AND OUT-OF-BUILDING PERSONAL REACH COMMUNICATIONS SYSTEM

CROSS REFERENCE TO RELATED APPLICATIONS

This application relates to subject matter described in U.S. Pat. No. 5,664,003, filed Jan. 23, 1996, for M. J. Foladare, S. B. Goldman, D. P. Silverman, and R. P. Weber, co-inventors herein, and assigned to the assignee hereof, and entitled "Personal Mobile Communications System With Two Points of Entry"; and in U.S. Pat. No. 5,742,906, filed simultaneously herewith, for M. J. Foladare, S. B. Goldman, D. P. Silverman, and R. P. Weber, and assigned to the assignee hereof, and entitled "Intelligent PBX In-Building and Out-of-Building Personal Reach Communications System".

TECHNICAL FIELD

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In copending applications Ser. Nos., 08/316,613 and 08/497,060 Personal Reach Systems (PRS) are described in which a page to a subscriber is initiated in response to a telephone call from a caller to a subscriber's special personal reach telephone number, and the subscriber in response to the page places a telephone call, namely a "return telephone call" to a meet-me bridge of a bridging and signaling unit within a PRS network platform at which the caller's telephone call is held for connection to the return telephone call. Upon receipt of the return telephone call at the bridging and signaling unit, the caller's telephone call and the return telephone call are bridged, i.e., connected together at the meet-me bridge holding the caller's call, so that the caller and the called party may communicate.

SUMMARY OF THE INVENTION

In accordance with the invention, when the bridging and signaling unit in the Personal Reach System network platform receives the personal reach telephone call from a calling party for a called party/subscriber, a connection is established between the bridging and signaling unit within the PRS to the PBX associated with the called party/subscriber's normal "home" (i.e., business or campus) location. The PBX, upon making the connection and receiving information over the connection that identifies the called party/subscriber, determines whether the called party/subscriber is local within the building or campus location using, for example, two-way paging technology to determine whether the called party/subscriber's pager is registered in the PBX's local area.

Determination of whether the pager-carrying called party/subscriber is within the environs of the paging transmitter in the home location, or is outside the local area, is automatically made by the local two-way paging system either by periodically polling the called party/subscriber's pager, or by signaling the pager upon establishing the connection to the PBX from the Personal Reach System. The receipt of a response or the lack of a response from the two-way pager is thus indicative of the presence or absence of the pager from the area local to the PBX.

If the called party/subscriber is determined to be within the local area, a local in-building/on-campus page is launched to the identified called party/subscriber. If the called party/subscriber responds to the local page with a return telephone call to the PBX, then the return call and the caller's call are bridged together at the PBX, thereby completing the connection between the calling and called parties. The connection between the bridging and signaling unit in the Personal Reach System can then be disconnected. A meet-me bridge in the PRS network platform is thus freed to handle another call.

Advantageously, by disconnecting the Personal Reach System network platform from the call path, less network equipment is required to complete the call and the cost to provide the connection is reduced. The cost of the call to the subscriber when he or she is within his or her normal work location can thus be reduced.

If a registered called party/subscriber chooses not to respond to the page with a return telephone call to the PBX, or fails to do so within a specified time, the caller's call optionally can be directed to the called party's voice mailbox in a voice-mail system associated with the PBX. Also, if the called party/subscriber is determined to be within the local area, but in fact does not respond with a return call within the specified time, the bridging and signaling unit can be signaled by the PBX over the connection therebetween to initiate a nationwide page. Thus, a called party/subscriber who may be exiting the local area can place a return call to the PRS network platform, which return call is then bridged to the caller's call by the bridging and signaling unit associated with the PRS network platform.

If the called party/subscriber is determined not to be within the local area of his or her home PBX, a nationwide page is similarly launched by the PRS network platform. A return call placed by the called party/subscriber to that system is then bridged to the caller's call in the PRS network platform, and the connection to the local PBX can be disconnected.

BRIEF DESCRIPTION OF THE DRAWINGS

FIGS. 2 and 3 together show an illustrative call-flow diagram of the steps of the present invention.

DETAILED DESCRIPTION

Figure 1:
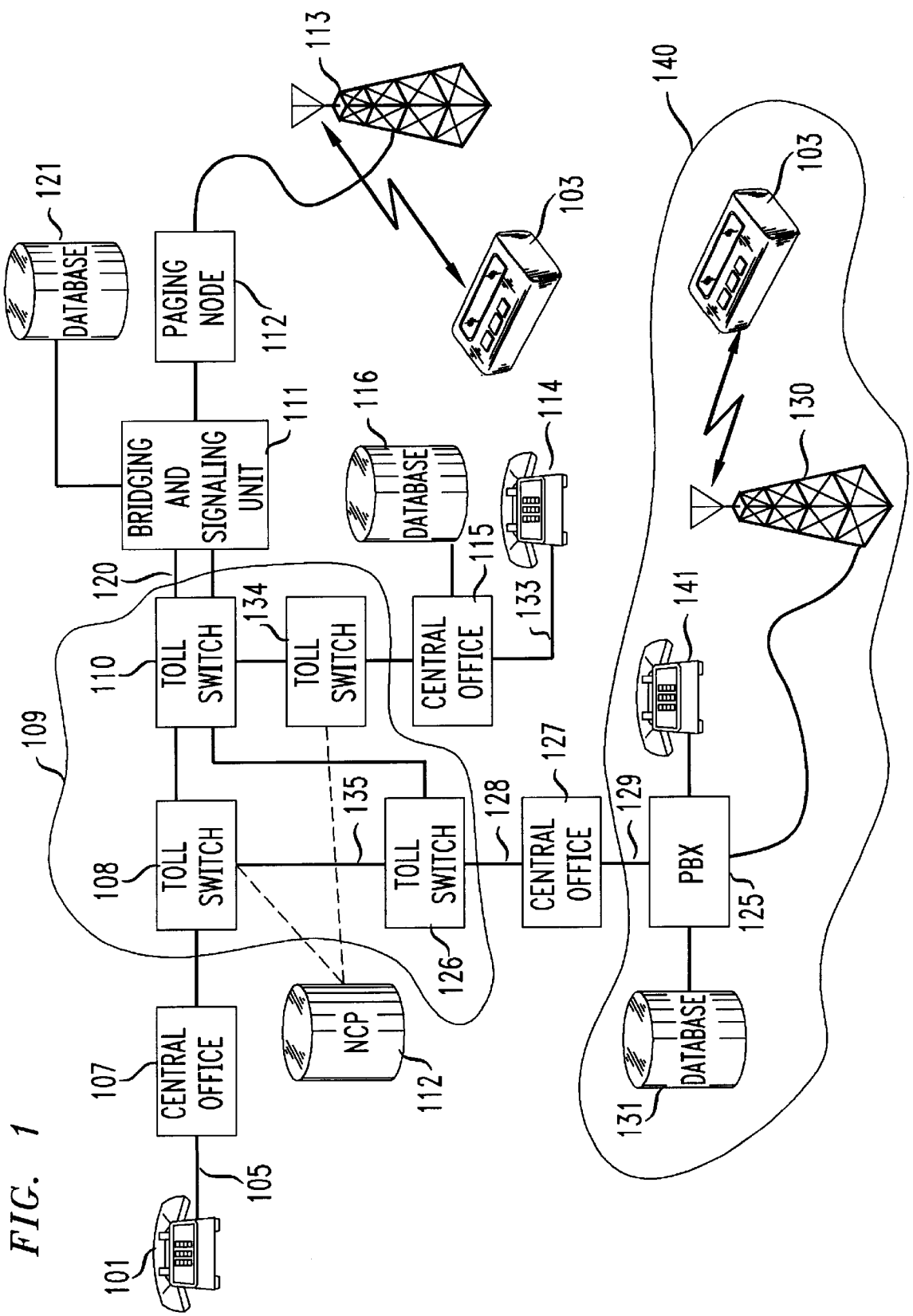
FIG. 1 is a block diagram of a telephone system incorporating a Personal Reach System and the present invention.

FIG. 1 shows an arrangement for providing telecommunications services in accordance with the present invention. A caller places a telephone call from the calling telephone 101 to the PRS telephone number of a called party/subscriber who is also associated with a pager 103. That PRS telephone number, in a preferred embodiment, is an 800-type of telephone number, which is uniquely associated with the called party/subscriber and, in turn, with a bridging and signaling unit 111 within a PRS network platform. The caller's telephone call is thus transmitted over telephone line 105 to a central office 107 within a local exchange network. Central office 107, in turn, routes the calling party's call to toll switch 108 within an inter-exchange network 109. A Network Control Point (NCP) database 112 associated with toll switch 108 translates the dialed 800-type number to a conventional destination area code +NPA+XXXX telephone number associated with the bridging and signaling unit 111 in a standard manner, and toll switch 108 thereupon routes the call within the interexchange network 109 to the toll switch 110 associated with the bridging and signaling unit 111. A two-way pager 103 is also associated with the called party/subscriber, as discussed further below.

Bridging and signaling unit 111 includes a plurality of so-called "meet-me" bridge circuits, each of which is designed for connecting at least two incoming telephone calls to each other. Upon receipt of the caller's telephone call, bridging and signaling unit 111 retrieves from an associated database 121, a telephone number that identifies the home PBX 125 associated with the called party, the latter, in a preferred embodiment, being determined by the number dialed by calling party from telephone 101, such number being provided to bridging and signaling unit 111 by toll switch 110. Alternatively, the calling party can provide identification of the called party/subscriber through a touch-tone sequence which is inputted after the bridging and signaling unit 111 answers the caller's telephone call. In response to the caller's call, an additional connection is thereupon established from bridging and signaling unit 111 in the network platform to the called party/subscriber's home PBX 125. This connection is made through the interexchange network 109 via the toll switch 110 associated with bridging and signaling unit 111 and the toll switch 126 associated with the central office 127 in the local exchange network in which PBX 125 is located.

PBX 125 is adapted to include the meet-me type of bridging functions of the type included within bridging and signaling unit 111 for bridging two telephone calls together. Furthermore, PBX has signal processing capabilities. A custom programmed Intuity™ based PBX available from Lucent Technologies. could be used as PBX 125. In accordance with the invention, PBX 125, upon connection to bridging and signaling unit 111, determines whether the called party/subscriber is within the local area 140 covered by PBX 125. If the called party/subscriber is determined to be within area 140, PBX 125 launches a local page within its associated building or campus environment. Thus, a signal is sent by PBX 125 to local transmitting tower 130 identifying the frequency and capcode of the two-way pager 103 carried by the called party/subscriber. This pager identification information is retrieved from a database 131 associated with PBX 125. That database stores a record for each PRS subscriber for which PBX 125 is his or her home PBX.

Each such record contains the subscriber's PRS telephone number used to reach the subscriber, which number uniquely identifies the subscriber, and the pager frequency and capcode associated with that subscriber used for initiating the local page. In addition each subscriber's record includes the local PBX exchange number associated with the subscriber, a voice-mailbox address associated with the subscriber, and the individual local PBX extension used by the subscriber in placing a return call in response to a local page and which associates a return call with a waiting call from the calling party. If an individual return call telephone extension is not assigned to each subscriber on the PBX, but rather return calls to the PBX from subscribers are made to a common extension, the sequence that a subscriber must input through touch-tone signals to identify him or herself is also stored in the subscriber's record in database 131 for purposes of associating a return call with a waiting call.

The identity of the called party is provided to PBX 125 by bridging and signaling unit 111 as the number dialed by the calling party from telephone 101. This information is passed through the inter-exchange network 109 to toll switch 126, and from there over a signaling channel of trunk 128 to central office 127, and thence over a signaling channel of trunk 129 to PBX 125. This information may be alternatively provided in-band or out-of-band.

In the preferred embodiment of the present invention, the determination of whether a called party/subscriber is within the local area 140 is made using two-way paging technology, which is well known in the art. In accordance with such well known paging technology, a pager 103 associated with a called party/subscriber can be determined to be registered within the local area 140 by periodically transmitting a polling signal to the pager. The pager 103, if within the local area, detects the polling signal and automatically transmits a response signal which is received by transmitting tower 130, and processed by PBX 125, thereby identifying pager 103 as being registered within area 140 to PBX 125. Alternatively, the pager 103 can be determined to be registered within local area 140 through the detection of a response that is automatically generated by the pager upon receipt of the paging signal transmitted by local tower 130 that is initiated by PBX 125 upon being connected to the Personal Reach System network platform. In either case, if a response from pager 103 is not detected by PBX 125, then pager 103 is out of the range covered by the local paging system, and the called party/subscriber is determined to be outside the office or campus environment 140 covered by PBX 125. If, however, PBX 125 determines that pager 103 is registered, then the called party/subscriber is within the office or campus environment 140 covered by the PBX. Bridging to calling party's call can thus be effected within PBX 125 if the called party/subscriber responds to the local page with a return call to that PBX.

If pager 103 is registered within the local office/campus area 140, and the called party/subscriber responds to the local page with a return call to PBX 125 then, using the transfer connect capabilities of the switched inter-exchange network as disclosed in U.S. Pat. No. 5,432,845 issued to Jul. 11, 1995 to M. A. Burd et all, entitled "Post Answer Telephone Call Redirection or Rerouting" and incorporated herein by reference, a connection 135 can be directly established between toll switch 108 and toll switch 126. The PRS network platform, including bridging and signaling unit 111, can then be disconnected and the caller's call directly connected from toll switch 108 to toll switch 126, and thereon to central office 127 and PBX 125. A return call from the called party/subscriber in response to the local page, made from telephone set 141 to PBX 125 to either a subscriber's unique return call number, or to the common return number followed by the touch-tone input of the subscriber's identification sequence, will effect bridging of the local return call and the calling party's call by PBX 125. Advantageously, by removing the PRS network platform from the path of the originating calling party's call and the called party/subscriber's return call, bridging and signaling unit 111 is able to free one of its meet-me bridges to handle another call. Thus, when the called party/subscriber is within his or her normal work or campus environment, substantial savings can be realized in providing a reach-me telephone service.

If the called party/subscriber is registered within local area 140, the connection between PBX 125 and bridging and signaling unit 111 is maintained until the return call is received by PBX 125, or for a predetermined time period. This allows a called party/subscriber who may be in the process of exiting the local area to place a return call to bridging and signaling unit 111 on the PRS network platform, in the manner as will be described hereinafter, for a called party/subscriber outside the local area who responds with a return call to a nationwide page. If the called party/subscriber does place a return call to the bridging and signaling unit 111 in the PRS network platform in response to the local page, the connection between bridging and signaling unit 111 and PBX 125 can be dropped. If the called party/subscriber is determined by pager 103 to be within local area 140, the connection between bridging and signaling unit 111 could alternatively be dropped immediately upon such determination.

If pager 103 is registered within the local area of PBX 125, an attempt to reach the subscriber can initially be made by ringing the subscriber's local extension on the PBX prior to or contemporaneously with the local page. Also, the called party/subscriber may affirmatively decide not to place a return call in response to a local page. The called party/subscriber may then affirmatively signal PBX 125 using the two-way paging capabilities pager 103, that he or she is not going to answer the call. A message may then be relayed to the calling party indicating that the subscriber presently is unable to take the call, and which invites the caller to leave a voice message in the subscriber's voice mailbox as determined by the subscriber's record stored in database 131. If the called party/subscriber is registered within the local area 140, but fails to respond with a return call within a specified time period or with an affirmative message via the pager 103, then the caller's call is also directed to the subscriber's voice mailbox. The calling party can then leave a voice message for later retrieval through PBX 125 by the called party/subscriber.

In any situation in which the called party/subscriber is determined to be local to the home PBX, the caller's call can be directed to the subscriber's local PBX for bridging to a return call, directed to a subscriber's local extension or to any other destination to complete the call, or directed to a subscriber's voice mailbox for purposes of leaving a voice message for later retrieval by the subscriber.

If the called party/subscriber is determined not to be registered within the local office or campus environment, then the Personal Reach System is signaled by PBX 125 to launch a nationwide page to the called party/subscriber. Bridging and signaling unit 111 forwards paging information to paging node 112. This paging information includes the frequency and capcode that uniquely identifies the called party/subscriber's pager 103, which paging information is retrieved from database 121 from the called party/subscriber's identity. In a preferred embodiment, the capcode and frequency used for the nationwide page may differ from that used for the local page due to different frequency bandwidths that might be available for nationwide and local paging purposes. Pagers with the capability of operating at different frequencies and different capcodes are known in the art. As shown in FIG. 1, the same pager 103 is illustrated as being both within the local area 140 of PBX 125 or outside the local area 140 to show both alternatives. For the nationwide page, paging node 112 initiates the broadcast of a paging signal containing the paging information from paging tower 113.

Upon detection of the nationwide paging signal, pager 103 alerts the called party/subscriber carrying the pager. In response to being alerted by the nationwide page, the subscriber can place a return call from the nearest telephone station 114 to a particular predetermined telephone number. Central office 115 receives the return telephone call over line 133, and routes it to bridging and signaling unit 111 for connection to the caller's telephone call. To this end, central office 115 routes the return call to toll switch 134, which is part of inter-exchange network 109.

The telephone number of the return telephone call is translatable, i.e., a database lookup is performed to determine the routing telephone number to which the call is actually completed. For example, the return telephone call is placed to an 800-type of telephone number. Thus, NCP database 112 translates the dialed 800-type of telephone number into a destination number to route the return call to the bridging and signaling unit 111. An advantage of using an 800-type of telephone number for the return call is that the called party/subscriber can place the return telephone call without needing to have any information about the area code of the telephone line being used. A database 116, associated with central office 115, provides routing information of the return call to the proper inter-exchange carrier.

The subscriber's return telephone call routed to bridging and signaling unit 111 is bridged with the call placed by the caller from telephone 101 by a meet-me type of bridge (not shown) within unit 111. Bridging of the return call of the subscriber to the originating call of the caller is effected by associating the telephone number dialed by the caller from telephone 101 with the telephone number dialed by the subscriber for the return telephone call from telephone 114. Specifically, the PRS telephone number dialed by the calling party is forwarded by the inter-exchange network over a signaling channel on a trunk 120 to bridging and signaling unit 111. Alternatively, the telephone number dialed by the caller from telephone 101 may be obtained by bridging and signaling unit 111 using in-band or out-of-band signaling. Database 121, connected to bridging and signaling unit 111, includes a record that also associates a subscriber's called number with a return telephone number. By properly associating the telephone number dialed by the subscriber in the return call from telephone 114, which number is also provided over signaling channel 120, with the number dialed by the caller from telephone 101 as per the record in database 121, bridging and signaling unit 111 effects the bridging together of the caller's call and the subscriber's return call.

Upon determining that the called party/subscriber is outside the local home location, the connection established between bridging and signaling unit 111 and PBX 125 can be removed. Alternatively, such connection can remain extant to connect the caller's call to the called party/subscriber's voice mailbox if the called party/subscriber does not respond to the nationwide page within a specified time. In that case the caller's call is bridged to the connection between toll switch 110 and PBX 125 for interaction with the called party/subscriber's voice mailbox system and delivery of a message for later retrieval by the called party/subscriber. If the connection between bridging and signaling unit 111 remains in place, the called party/subscriber, in response to the nationwide page, may dial directly into the PBX for bridging with the call, if he or she is located within the vicinity of the home PBX. Then, as previously described, using the transfer connect capabilities of the network, the PRS network platform is disconnected from the calling party's call.

Figure 2:
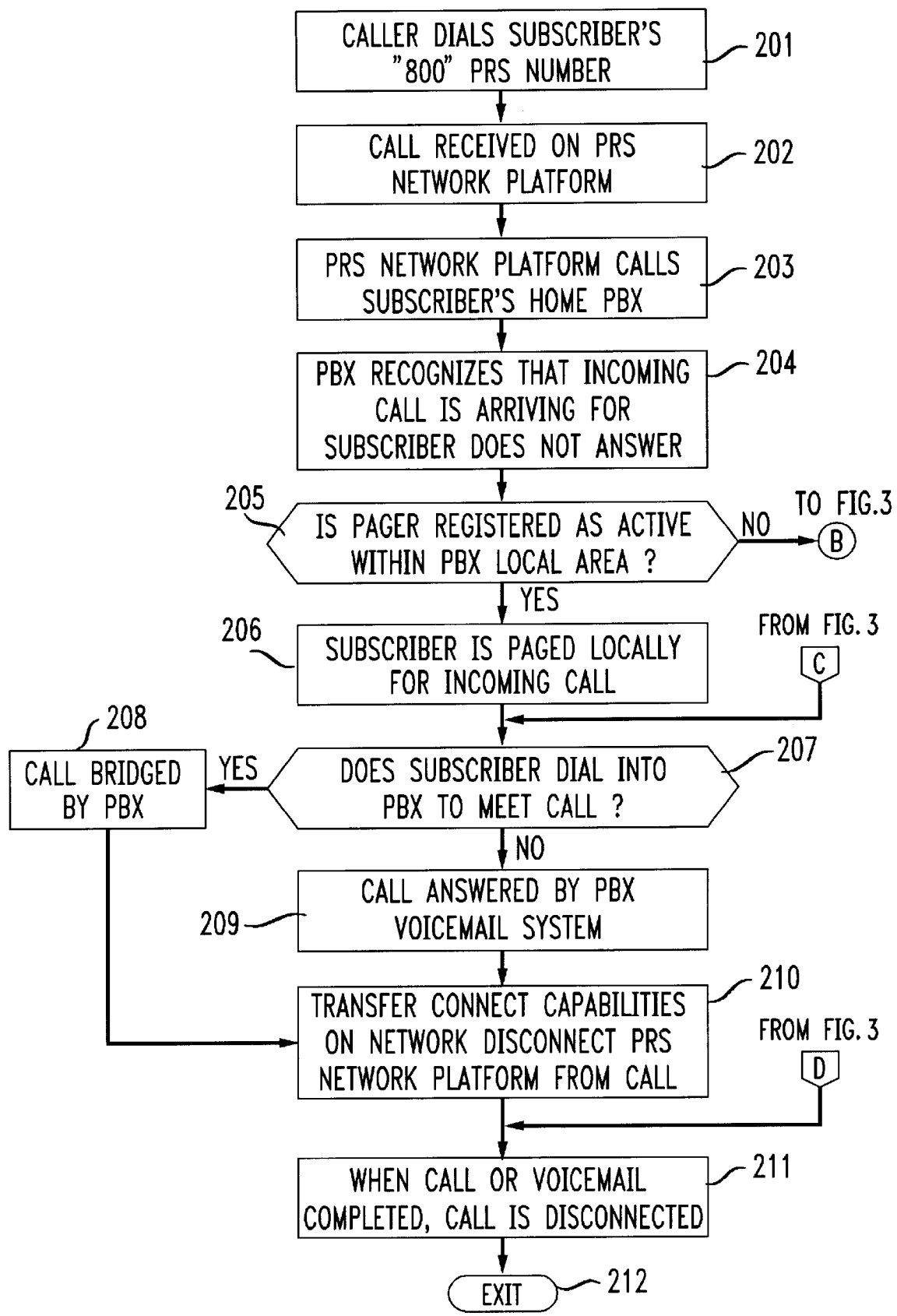

The flow charts in FIGS. 2 and 3 together show the call flow process of establishing a connection between a calling party and a called party/subscriber in a Personal Reach System in accordance with the present invention. At step 201, the caller dials the PRS 800-type telephone number associated with the called party/subscriber. At step 202, the call is connected to the network platform that supports the PRS service, shown in FIG. 1 as including the bridging and signaling unit 111 and associated database 121. At step 203, the network platform calls the called party's local PBX that has meet-me bridging capabilities. At step 204, the PBX recognizes that the incoming call is arriving for a PRS subscriber but does not answer. At decision step 205, the PBX determines whether the subscriber's pager is registered as being active with the local area of the PBX. If registered within the PBX local area, at step 206, the PBX pages the subscriber to indicate the presence of a call local to the PBX. A determination of whether the subscriber has dialed into the PBX to meet the call is made at step 207. If yes, at step 208, the call is bridged by the PBX. If no, at step 209, the call is answered by the PBX voice mailbox system. After either alternative steps 208 or 209, at step 210, the transfer connect capabilities of the network disconnect the PRS network platform from the call. At step 211, when the call or the voice mail message has been completed, the call may be disconnected, ending the process at step 212.

If the PBX determines at step 205 that the pager is not registered within the local area, then at step 213 the PBX sends a message to the PRS network platform indicating that the pager is not within the PBX local serving area. The PRS network platform, at step 214, initiates a nationwide page to the subscriber. If the local PBX has disconnected the call leg from the network platform at step 215, then at step 216, a determination is made whether the subscriber calls into the network platform within a predetermined time interval. If the subscriber has called in, then at step 217, the caller and the subscriber are bridged in the network. If the subscriber does not call the network platform within the predetermined time interval, then at step 218, the calling party's call is sent to a voice mail system. If at step 215, the PBX has not disconnected the call leg from the network platform, then at step 219, as in step 216, a determination is made whether the subscriber calls into the network platform within a predetermined time interval. If yes, the subscriber and the caller are bridged in the network at step 217. After the two calls are bridged in step 217 following either step 216 or 219, or after the call is sent to voice-mail in step 218, the call is disconnected at step 211 and the call flow ends at exit 212. If, at step 219, the subscriber does not call into the PRS network platform within a predetermined time, then call flow proceeds to step 207 to determine whether or not the subscriber responds to the nationwide page by dialing into the local PBX. The call flow then proceeds as if the subscriber does or does not answer a local page, except that the subscriber's pager was never in fact registered as being within the local area and therefore never received a local page.

In the embodiment of the present invention described hereinabove, two-way paging is the methodology used to determine whether a called party/subscriber is within the local area served by his or her "home" PBX. Other methods could also be used to determine whether the called party/subscriber is within the PBX's local area. For example, any methodology which requires the called party/subscriber to manually or automatically check into and out of a local area which registers the party as being within or outside the local area could be used. For example, in an office building environment in which employees register themselves by means of a smart-card upon their entry and exit through either a door or a parking garage could also be used, whereby the information associated with each employees entry and exit is passed from the smart-card system to the local PBX.

The above-described embodiment is illustrative of the principles of the present invention. Other embodiments could be devised by those skilled in the art without departing from the spirit and scope of the present invention.

The invention claimed is:

1. A method for use in completing a telephone call from a calling party that is placed to a personal telephone number of a called party/subscriber, the method comprising the steps of:

receiving said calling party's call at a meet-me bridge that bridges two calls together;

determining the home PBX of the called party/subscriber from the personal telephone number called by the caller in response to receiving said calling party's call;

establishing a connection between the meet-me bridge and the home PBX of the called party/subscriber; and determining whether the called party/subscriber is within an area local to the home PBX of the called party/subscriber at the time said calling party's call is received.

2. The method of claim 1 wherein the step of determining whether the called party/subscriber is within an area local to the home PBX comprises the step of using two-way paging technology to determine whether a pager associated with the called party/subscriber is within the area local to the home PBX.

3. The method of claim 1 further comprising the step of connecting the calling party's call directly to the home PBX if the called party/subscriber is determined to be within the area local to home PBX.

4. The method of claim 3 further comprising the steps of:

if called party/subscriber is determined to be within the area local to the home PBX, locally paging the called party/subscriber within the area local to the home PBX to alert the called party/subscriber that a telephone call is waiting;

if the called party/subscriber is responsive to the local page, receiving a return telephone call from the called party/subscriber at the home PBX; and bridging together at the home PBX the telephone call from the calling party and the called party/subscriber's return telephone call.

5. The method of claim 3 further comprising the step of disconnecting the connection between the meet-me bridge and the home PBX.

6. The method of claim 4 further comprising the step of disconnecting the connection between the meet-me bridge and the home PBX if a return telephone call from the called party/subscriber is received at the home PBX.

7. The method of claim 2 wherein the step of determining whether the pager associated with the called party/subscriber is within an area local to the home PBX of the called party/subscriber comprises the step of determining whether the pager is registered in the local area.

8. The method of claim 4 further comprising the step of connecting the call from the calling party to a voice mailbox associated with the called party/subscriber's home PBX and belonging to the called party/subscriber if the called party is determined to be within the area local to the home PBX and the called party/subscriber is not responsive to the local page within a predetermined time.

9. The method of claim 1 further comprising the steps of:

initiating a nationwide page to the pager if it is determined that the called party/subscriber is not within the area local to the called party/subscriber's home PBX;

receiving a return telephone call from the called party/subscriber at the meet-me bridge in response to the nationwide wide; and bridging together at the meet-me bridge the calling party's call and the return call.

10. In a personal reach telephone system in which a call from a calling party to a called party/subscriber's personal reach telephone number is bridged to a return call placed by the called party/subscriber in response to a page to a pager associated with the called party/subscriber which page indicates to the called party/subscriber that a call from a calling party has been placed to the called party/subscriber's personal reach telephone number, a meet-me bridge being located in a bridging and signaling unit to which the call from the calling party is connected, the called party/subscriber being associated with a home PBX having meet-me bridging capabilities, a method comprising the steps of:

establishing a connection between the bridging and signaling unit and the home PBX associated with the called party/subscriber in response to a call received at the bridging and signaling unit for the called party/subscriber; and determining whether the called party/subscriber is within an area local to the home PBX at the time the call for the called party/subscriber is received.

11. The method of claim 10 wherein the pager is a two-way pager and the step of determining whether the called party/subscriber is within an area local to the home PBX comprises the step of using two-way paging technology to determine whether the pager is within the area local to the home PBX.

12. The method of claim 10 further comprising the steps of:

if the called party/subscriber is determined to be within the area local to the home PBX, locally paging the called party/subscriber to alert the called party that a telephone call is waiting;

if the called party is responsive to the local page, receiving a return telephone call from the called party at the home PBX; and bridging together at the home PBX the telephone call from the calling party and the called party's return telephone call.

13. The method of claim 10 further comprising the steps of:

if the called party is determined not to be within the area local to the home PBX, broadcasting a nationwide page to the pager, if the called party is responsive to the nationwide page, receiving a return telephone call at the meet-me bridge from the called party; and bridging together at the meet-me bridge the calling party's call and the return telephone call.

* * * * *